Patented Sept. 21, 1926.

1,600,773

UNITED STATES PATENT OFFICE.

WILLIAM J. O'BRIEN, OF BALTIMORE, MARYLAND, ASSIGNOR TO THE GLIDDEN COMPANY, OF ST. HELENA, BALTIMORE, MARYLAND, A CORPORATION OF OHIO.

LITHOPONE AND PROCESS FOR PRODUCING SAME.

No Drawing. Original application filed September 26, 1924, Serial No. 740,086. Divided and this application filed November 16, 1925. Serial No. 69,503.

The present invention relates to a method of producing an improved lithopone.

The present application is a division of my co-pending application for lithopone and processes for producing same, filed September 26, 1924, Serial No. 740,086.

As is well known, in the production of ordinary commercial lithopone, a solution of zinc sulphate ($ZnSO_4$) and barium sulphide, (BaS) are employed, and a co-precipitate of zinc sulphide (ZnS) and barium sulphate ($BaSO_4$) is obtained. The precipitate is treated in accordance with the well known practice in the art, for the production of lithopone.

I am aware of the fact that attempts have heretofore been made to improve the character of lithopone. For instance, ultra marine blue has been added to the same to improve its color. To improve its light resistance, phosphates, or alkaline earths, have been added.

I have discovered that the properties of the lithopone may be greatly improved by the addition thereto of a titanium compound, such as titanium oxide ($TiO_2$).

The manner in which the titanium compound is to be combined with the lithopone, may vary.

I contemplate adding the titanium compound, such as titanium oxide, to a zinc sulphate solution, for producing a suspension in such solution. The barium sulphide solution is now introduced into the suspension of the titanium compound, in the zinc sulphate solution, and the mass is thoroughly stirred. A co-precipitate of zinc sulphide and barium sulphate is obtained, with the titanium compound carried down. The titanium compound is preferably added in such proportions that from about five to twenty parts by weight of the same will be present in the final product, and the lithopone pigment will be present in about eighty to ninety-five parts by weight. However, the proportions may be slightly varied beyond these limits.

The mixture thus obtained, is filter pressed, muffled, quenched in water, ground wet, filter pressed, dried, and ground. It is then ready for packing in cans, or the like, for shipment.

I also contemplate adding the titanium compound, such as titanium oxide, either in suspension or in the powdered form, to freshly precipitated lithopone. In either case the mixture, thus obtained, is filter pressed, muffled, quenched in water, ground wet, filter pressed, dried, and ground. It is then ready for packing in cans, or the like, for shipment. In this process, the titanium compound is added in such proportions that it is present in the final product in from five to twenty parts by weight, while the lithopone is present in from eighty to ninety-five parts by weight.

The improved lithopone pigment produced, is a fine white lithopone, containing from about five to twenty per cent by weight of the titanium compound, with respect to the total weight of the mass. The product has a high resistance to light, and a greatly increased covering capacity, with a marked improvement over the ordinary commercial lithopone, with respect to weather resistance. It also shows a marked improvement in behavior when ground with oils, as it does not tend to liver or harden.

It is to be understood that the forms of my invention herewith shown and described, are to be taken as preferred examples of the same, and that various changes may be resorted to in the order of the steps of the methods, and that chemical equivalents may be employed, without departing from the spirit of my invention, or the scope of the subjoined claims.

Having thus described my invention, what I claim is:

1. The method of producing an improved lithopone pigment, which comprises subjecting a zinc sulphate solution to the action of a barium sulphide solution in the presence of titanium oxide, whereby the constituents of lithopone are obtained with the added titanium oxide, and treating the mass thus obtained for producing the completed lithopone.

2. The method of producing an improved lithopone pigment which comprises the steps of subjecting a zinc sulphate solution to the action of a barium sulphide solution in the presence of titanium oxide.

3. The method of producing an improved pigment comprising the steps of effecting the precipitation of lithopone in the presence of titanium oxide.

4. The method of producing an improved lithopone pigment, comprising adding titanium oxide to a zinc sulphate solution, for producing a suspension of the titanium oxide in such solution, mixing the resultant liquid mass with a barium sulphide solution whereby a co-precipitate of zinc sulphide and barium sulphate is obtained with the titanium oxide carried down, and treating the resultant product for producing completed lithopone.

In testimony whereof I affix my signature.

WILLIAM J. O'BRIEN.